(12) United States Patent
Cuijpers et al.

(10) Patent No.: US 8,135,040 B2
(45) Date of Patent: Mar. 13, 2012

(54) ACCELERATED CHANNEL CHANGE

(75) Inventors: Maurice Cuijpers, Redmond, WA (US); Frans Vink, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1256 days.

(21) Appl. No.: 11/292,298

(22) Filed: Nov. 30, 2005

(65) Prior Publication Data

US 2007/0121629 A1   May 31, 2007

(51) Int. Cl.
*H04J 3/26* (2006.01)
*H04H 20/28* (2008.01)
*H04N 7/173* (2011.01)

(52) U.S. Cl. ............ 370/486; 370/432; 725/90; 725/105

(58) Field of Classification Search .................. 370/321, 370/326; 725/114, 118, 131, 138, 139, 144, 725/151, 39; 348/731
See application file for complete search history.

(56) References Cited

U.S. PATENT DOCUMENTS

| | | |
|---|---|---|
| 5,461,415 A | 10/1995 | Wolf et al. |
| 5,473,362 A | 12/1995 | Fitzgerald et al. |
| 5,583,868 A | 12/1996 | Rashid et al. |
| 5,631,694 A | 5/1997 | Aggarwal et al. |
| 5,699,362 A | 12/1997 | Makam |
| 5,724,646 A | 3/1998 | Ganek et al. |
| 5,732,217 A | 3/1998 | Emura |
| 5,822,537 A | 10/1998 | Katseff et al. |
| 5,884,141 A | 3/1999 | Inoue et al. |
| 5,892,915 A | 4/1999 | Duso et al. |
| 5,926,230 A | 7/1999 | Niijima et al. |
| 5,936,659 A | 8/1999 | Viswanathan et al. |
| 5,963,202 A | 10/1999 | Polish |
| 6,047,317 A | 4/2000 | Bisdikian et al. |
| 6,078,594 A | 6/2000 | Anderson et al. |
| 6,118,498 A | 9/2000 | Reitmeier |
| 6,138,147 A | 10/2000 | Weaver et al. |
| 6,222,482 B1 | 4/2001 | Gueziec |
| 6,222,886 B1 | 4/2001 | Yogeshwar |
| 6,266,817 B1 | 7/2001 | Chaddha |
| 6,330,286 B1 | 12/2001 | Lyons et al. |
| 6,418,473 B1 | 7/2002 | St. Maurice et al. |

(Continued)

FOREIGN PATENT DOCUMENTS

CA     2480461     10/2003

(Continued)

OTHER PUBLICATIONS

Zhang, et al., "Data Modeling of Moving Objects with GPS/GIS in Web Environment", International Conference on Communications, Circuits and Systems and West Sino Exposition Proceedings, 2002, vol. 2, pp. 1581-1585.

(Continued)

*Primary Examiner* — Marsha D Banks Harold
*Assistant Examiner* — Christopher Wyllie

(57) ABSTRACT

Channel changing can be accelerated by multicasting a bouquet of multicast burst streams from a server. In an example implementation, each multicast burst stream is delayed sufficiently so that a past independent frame is available for delivery to and display by a client device without waiting for a future independent frame. A multicast burst segment of a multicast burst stream includes a portion in which the bandwidth exceeds the nominal data rate of the underlying resource being streamed. The temporal delay between adjacent multicast burst streams in a multicast bouquet is set responsive to a maximum client delay time for tuning to a new resource stream.

14 Claims, 11 Drawing Sheets

U.S. PATENT DOCUMENTS

| | | |
|---|---|---|
| 6,430,547 B1 | 8/2002 | Busche et al. |
| 6,496,814 B1 | 12/2002 | Busche |
| 6,505,106 B1 | 1/2003 | Lawrence et al. |
| 6,564,262 B1 | 5/2003 | Chaddha |
| 6,580,754 B1 | 6/2003 | Wan et al. |
| 6,609,149 B1 | 8/2003 | Bandera et al. |
| 6,615,133 B2 | 9/2003 | Boies et al. |
| 6,637,031 B1 | 10/2003 | Chou |
| 6,721,952 B1 | 4/2004 | Guedalia et al. |
| 6,728,965 B1 | 4/2004 | Mao |
| 6,738,980 B2 | 5/2004 | Lin et al. |
| 6,751,129 B1 | 6/2004 | Gongwer |
| 6,751,626 B2 | 6/2004 | Brown et al. |
| 6,766,245 B2 | 7/2004 | Padmanabhan |
| 6,784,945 B2* | 8/2004 | Norsworthy et al. ......... 348/731 |
| 6,837,031 B1 | 1/2005 | Hannen et al. |
| 6,842,724 B1 | 1/2005 | Lou et al. |
| 6,856,759 B1 | 2/2005 | Fukuda et al. |
| 7,051,170 B2 | 5/2006 | Guo |
| 7,106,749 B1 | 9/2006 | Darshan et al. |
| 7,158,531 B2 | 1/2007 | Barton |
| 7,167,488 B2 | 1/2007 | Taylor et al. |
| 7,382,796 B2 | 6/2008 | Haberman et al. |
| 7,430,222 B2* | 9/2008 | Green et al. .................. 370/486 |
| 7,477,653 B2* | 1/2009 | Smith et al. ................... 370/432 |
| 7,548,995 B2* | 6/2009 | Thukral .......................... 710/20 |
| 2002/0002708 A1 | 1/2002 | Arye |
| 2002/0024956 A1* | 2/2002 | Keller-Tuberg .......... 370/395.52 |
| 2002/0031144 A1 | 3/2002 | Barton |
| 2002/0040481 A1 | 4/2002 | Okada et al. |
| 2002/0107968 A1 | 8/2002 | Horn et al. |
| 2002/0108119 A1* | 8/2002 | Mao et al. ...................... 725/109 |
| 2002/0114331 A1 | 8/2002 | Cheung et al. |
| 2002/0124258 A1 | 9/2002 | Fritsch |
| 2002/0144276 A1 | 10/2002 | Radford et al. |
| 2002/0147979 A1 | 10/2002 | Corson |
| 2002/0147991 A1 | 10/2002 | Furlan et al. |
| 2002/0170067 A1 | 11/2002 | Norstrom et al. |
| 2003/0037331 A1 | 2/2003 | Lee |
| 2003/0060196 A1* | 3/2003 | Levinberg ..................... 455/428 |
| 2003/0093801 A1 | 5/2003 | Lin et al. |
| 2003/0106053 A1 | 6/2003 | Sih et al. |
| 2003/0158899 A1 | 8/2003 | Hughes |
| 2003/0158957 A1* | 8/2003 | Abdolsalehi .................. 709/231 |
| 2003/0159143 A1 | 8/2003 | Chan |
| 2003/0202594 A1 | 10/2003 | Lainema |
| 2003/0202775 A1 | 10/2003 | Junkersfeld et al. |
| 2004/0003399 A1 | 1/2004 | Cooper |
| 2004/0034863 A1 | 2/2004 | Barrett et al. |
| 2004/0034864 A1 | 2/2004 | Barrett et al. |
| 2004/0049793 A1 | 3/2004 | Chou |
| 2004/0120276 A1* | 6/2004 | Golla et al. ..................... 370/321 |
| 2004/0128694 A1 | 7/2004 | Bantz et al. |
| 2004/0133907 A1* | 7/2004 | Rodriguez et al. .............. 725/14 |
| 2004/0154041 A1* | 8/2004 | Zhang .............................. 725/74 |
| 2004/0160971 A1 | 8/2004 | Krause et al. |
| 2004/0160974 A1* | 8/2004 | Read et al. ..................... 370/431 |
| 2004/0255328 A1 | 12/2004 | Baldwin et al. |
| 2005/0039214 A1 | 2/2005 | Lorenz et al. |
| 2005/0053086 A1* | 3/2005 | Mehta et al. ................... 370/432 |
| 2005/0071496 A1 | 3/2005 | Singal et al. |
| 2005/0078680 A1* | 4/2005 | Barrett et al. .............. 370/395.4 |
| 2005/0078757 A1* | 4/2005 | Nohrden .................. 375/240.28 |
| 2005/0080904 A1 | 4/2005 | Green |
| 2005/0081243 A1 | 4/2005 | Barrett et al. |
| 2005/0081244 A1* | 4/2005 | Barrett et al. ................... 725/97 |
| 2005/0081246 A1 | 4/2005 | Barrett et al. |
| 2005/0091690 A1* | 4/2005 | Delpuch et al. ................. 725/88 |
| 2005/0128951 A1 | 6/2005 | Chawla et al. |
| 2005/0154917 A1 | 7/2005 | deCarmo |
| 2005/0172314 A1 | 8/2005 | Krakora et al. |
| 2005/0190781 A1 | 9/2005 | Green et al. |
| 2005/0240961 A1 | 10/2005 | Jerding et al. |
| 2006/0018379 A1* | 1/2006 | Cooper ..................... 375/240.12 |
| 2006/0020995 A1* | 1/2006 | Opie et al. ..................... 725/117 |
| 2006/0117343 A1 | 6/2006 | Novak et al. |
| 2006/0117358 A1 | 6/2006 | Baldwin et al. |
| 2006/0117359 A1* | 6/2006 | Baldwin et al. ................. 725/90 |
| 2006/0126667 A1* | 6/2006 | Smith et al. ................... 370/486 |
| 2006/0184973 A1* | 8/2006 | de Heer et al. .................. 725/80 |
| 2006/0242240 A1* | 10/2006 | Parker et al. .................. 709/205 |
| 2006/0251082 A1 | 11/2006 | Grossman et al. |
| 2007/0019675 A1* | 1/2007 | Weber ............................ 370/468 |
| 2007/0091789 A1* | 4/2007 | Thukral ......................... 370/216 |
| 2007/0113261 A1 | 5/2007 | Roman et al. |
| 2007/0121629 A1* | 5/2007 | Cuijpers et al. ............... 370/390 |
| 2008/0216116 A1* | 9/2008 | Pekonen et al. ................. 725/39 |
| 2009/0077255 A1* | 3/2009 | Smith et al. ................... 709/231 |

FOREIGN PATENT DOCUMENTS

| | | |
|---|---|---|
| EP | 0633694 A | 1/1995 |
| EP | 1294193 | 3/2003 |
| WO | WO9806045 | 2/1998 |
| WO | WO9909741 | 2/1999 |
| WO | WO0009741 | 2/2000 |
| WO | WO0103373 | 1/2001 |
| WO | WO0126271 | 4/2001 |
| WO | WO0156285 | 8/2001 |
| WO | WO02087235 | 10/2002 |
| WO | WO03088646 | 10/2003 |
| WO | WO2004062291 | 7/2004 |

OTHER PUBLICATIONS

Zhang, et al., "The Cost Model of Moving Objects Communication with GPS", International Conference on Communications, Circuits and Systems and West Sino Exposition Proceedings, 2002, vol. 2, pp. 1576-1580.

Wolfson, et al., "Modeling Moving Objects for Location Based Services", Lectures Notes in Computer Science, 2002, vol. 2538, pp. 46-58.

Turk, et al., "Face Recognition using Eigenfaces", CVPR, 1991, pp. 586-591.

Tsai, Roger Y., "An Efficient and Accurate Camera Calibration Technique for 3D Machine Vision", Proceedings of the Computer Vision and Pattern Recognition, 1986, pp. 364-374.

Benabdelkader, et al., "Stride and Cadence as a Biometric in Automatic Person Identification and Verification", 5th International Conference on Automatic Face and Gesture Recognition, May 20, 2002, pp. 1-6.

Benabdelkader, et al., "Combining Holistic and Parametric Approaches for Gait Recognition", Submitted tp IEEE Transactions on Pattern Analysis and Machine Intelligence, Dec. 2002, 37 Pages.

Benabdelkader, et al., "Motion based Recognition of People in Eigengait Space", 5th International Conference on Automatic Face and Gesture Recognition, May 20, 2002, pp. 1-6.

Benabdelkader, et al., "Person Identification Using Automatic Height and Stride Estimation", IEEE International Conference on Pattern Recognition, Aug. 15, 2002, pp. 1-4.

Benabdelkader, et al., "View-Invariant Estimation of Height and Stride for Gait Recognition", Workshop on Biometric Authentication (BIOMET), in association with ECCV 2002, Jun. 1, 2002, 12 pages.

Benabdelkader, et al., "EigenGait: Motion-Based Recognition of People Using Image Self-Similarity", Proc. Intl. on Audio and Video-based Person Authentication (AVBPA), 2001, 11 pages.

Cutler, et Al., "Robust Real-Time Periodic Motion Detection, Analysis, and Applications", IEEE Transactions on Pattern Analysis and Machine Intelligence (PAMI), vol. 22, No. 8. Aug. 2000, pp. 781-796.

Ding, et al., "Resource-Based Striping: An Efficient Striping Strategy for Video Servers Using Heterogeneous Disk-Subsystems", Multimedia Tools and Applications, vol. 19, No. 1, Jan. 2003, pp. 29-51.

Elgammal, et al., "Non-parametric Model for Background Subtraction", IEEE ICCV 99 Frame Rate Workshop, IEEE 7th International Conference on Computer Vision, Kerkyra, Greece, Sep. 1999, pp. 1-17.

Gil, et al., "Simulation of a Mobility-Prediction Scheme Based on Neuro—Fuzzy Theory in Mobile Computing", Simulation, Jul. 2000, vol. 75, No. 1, pp. 6-17.

Gonzalez, et al., "Load Sharing Based on Popularity in Distributed Video on Demand Systems", Proceedings 2002 IEEE Intl. Conf. on Multimedia and Expo, vol. 1, Aug. 2002, pp. 5-8.

Haritaoglu, et al., "W4S: A Real-Time System for Detecting and tracking People in 2 1/2 D", in European Conference on Computer Vision, 1998, 16 pages.

Lee, Jack Y.B., "Staggered Push: A Linearly Scalable Architecture for Push-Based Parallel Video Servers", IEEE Transactions on Multimedia, vol. 4, No. 4, Dec. 2002, pp. 423-434.

Lo, et al., "Deploy Multimedia-on-Demand Services over ADSL Networks", PCM 2002, Lecture Notes in Computer Science, vol. 2532, Dec. 2002, pp. 295-302.

Song, et al., "Replica Striping for Multi-Resolution Video Servers", IDMS/PROMS 2002, Lecture Notes in Computer Science, vol. 2515, No. 2002, pp. 300-312.

U.S. Appl. No. 10/218,674; Barrett, et al.; filed Aug. 13, 2002.

Non Final Office Action for U.S. Appl. No. 10/218,674, Dated Jan. 9, 2007.

Non Final Office Action for U.S. Appl. No. 10/218,674, Dated Oct. 10, 2007.

Final Office Action for U.S. Appl. No. 10/218,674, Dated Apr. 14, 2008.

U.S. Appl. No. 10/798,993, Barrett, et al., filed Mar. 12, 2004.

Non-Final Office Action Received for U.S. Appl. No. 10/798,993, Dated Jul. 8, 2008.

U.S. Appl. No. 10/800,287, Barrett, et al., filed Mar. 12, 2004.

Non Final Office Action Received for U.S. Appl. No. 10/800,287, Dated Oct. 3, 2007.

Final Office Action Received for U.S. Appl. No. 10/800,287, Dated Mar. 18, 2008.

U.S. Appl. No. 10/800,309, Barrett, et al., filed Mar. 12, 2004.

Non Final Office Action Received for U.S. Appl. No. 10/800,309, Dated Oct. 5, 2007.

Non Final Office Action Received for U.S. Appl. No. 10/800,309, Dated Apr. 4, 2008.

U.S. Appl. No. 10/218,675; Barrett, et al.; filed Aug. 13, 2002.

Non Final Office Action for U.S. Appl. No. 10/218,675 Dated May 8, 2007.

Non Final Office Action for U.S. Appl. No. 10/218,675 Dated Jan. 24, 2008.

Final Office Action for U.S. Appl. No. 10/218,675 Dated Sep. 4, 2008.

U.S. Appl. No. 11/010,200, Smith, et al.; filed Dec. 10, 2004.

Non Final Office Action for U.S. Appl. No. 11/010,200, Dated Apr. 8, 2008.

U.S. Appl. No. 11/010,200; Smith, et al.; filed Dec. 10, 2004.

Armitage, "Support for Multicast over UNI 3.0/3.1 based ATM Networks", RFC 2022, Standards Track, Nov. 1996, pp. 1-82.

Halvorsen, et al., "Q-L/MRP: A Buffer Management Mechanism for QoS Support in a Multimedia DBMS", IEEE 1998, pp. 162-171.

Hurst et al., "MPEG Splicing: A New Standard for Television-SMPTE 312M", SMPTE Journal, Nov. 1998, pp. 978-988.

Kamiyama et al., "Renegotiated CBR Transmission in Interactive Video-on-Demand System", IEE 1997, pp. 12-19.

Lu, et al., "Experience in designing a TCP/IP based VOD system over a dedicated network", IEE 1997, pp. 262-266.

McKinley, et al., "Group Communication in Multichanel Networks with Staircase Interconnection Topologies", Computer Communication Review, ACM, Sep. 1989, vol. 19, No. 4, pp. 170-181.

Petit, et al., "Bandwidth Resource Optimization in Video-On-Demand Network Architectures", IEEE 1994, pp. 91-97.

State, et al.,"Active Network Based Management For QoS Assured Multicast Delivered Media", Joint 4th IEEE Int'l Conf. on ATM and High Speed Intelligent Internet Symposium, Apr. 2001, pp. 123-127.

Wee, et al., "Splicing MPEG Video Streams in the Compressed Domain", IEEE 1997, pp. 224-230.

Wu, at al., "Scalable Video Coding and Transport over Broad-Band Wireless Networks", Proceedings of the IEEE, Jan. 2001, vol. 89, No. 1, pp. 6-20.

Zhou, et al., "On-line Scene Change Detection of Multicast (MBone) Video", Proceedings of the SPIE-The International Society for Optical Engineering, Nov. 1998, vol. 3527, pp. 271-282.

Digital Headend Solutions; Tune in to Digital TV, retrieved from the Internet on Nov. 3, 2005: http://www.tutsystems.com/digitalheadend/solutions/index.cfm, 1 page.

MediaFLO; Introducing FLO Technology: retrieved from the Internet on Nov. 3, 2005: http://www.qualcomm.com/mediaflo/news/pdf/flo_whitepaper.pdf, pp. 1-8.

Infovalue Experts; Info Value Unveils Industry's First Video Multicasting Solution with Instant Replay, retrieved from the Internet on Nov. 3, 2005: http://www.infovalue.com/links/news%20room/press%20releases/1999/Press_%20First_Multicasting_with_Instant_Replay.pdf, 3 pages.

QuickTime Streaming your Media in Real Time, retrieved from the Internet on Nov. 3, 2005: http://www.apple.com.tw/quicktime/technologies/streaming/, 3 pages.

Optibase MGW 2400, retrieved from the Internet Nov. 3, 2005: http://www.epecom graphics.com/optibase_mgw2400_features.html, 2 pages.

Murphy, "Overview of MPEG", retrieved on Mar. 29, 2007, at <<http://web.archive.org/web/20001203031200/http://www.eeng.dcu.ie/~murphyj/the/the/no...>>, pp. 1-3.

* cited by examiner

ACCELERATED CHANNEL CHANGE

BACKGROUND

Digital television enables network service providers to offer many new capabilities and services. For example, modern video compression/decompression algorithms (codecs) enable many digital channels to be squeezed into bandwidth that is otherwise consumed by only a few analog channels. Additionally, using digital media streams facilitates the offering of video-on-demand (VOD) programs. Digital media streams also facilitate the inclusion of other related data along with the television signal transmission. The other related data may be used to offer additional interactive services.

However, digital television suffers from one drawback that frustrates many customers and therefore concerns industry players. Changing channels is usually much slower with digital television as compared to traditional analog television. Analog channel changes, which often take 300-500 milliseconds (ms), are generally interpreted by viewers to be essentially instantaneous. Digital channel changes, on the other hand, are usually not interpreted to be instantaneous.

Many current users of digital television are familiar with the black screen that greets them for a number of seconds as they switch to a new digital channel. In fact, channel changes with digital television can take several seconds (e.g., up to 3-5 seconds) with current codecs. Although future codecs will likely consume significantly less bandwidth than current ones, these future codecs may very well stretch this channel-changing delay to a seemingly unacceptable period of over 10 seconds.

SUMMARY

Channel changing can be accelerated by multicasting a bouquet of multicast burst streams from a server. In an example implementation, each multicast burst stream is delayed sufficiently so that a past independent frame is available for delivery to and display by a client device without waiting for a future independent frame. A multicast burst segment of a multicast burst stream includes a portion in which the bandwidth exceeds the nominal data rate of the underlying resource being streamed. The temporal delay between adjacent multicast burst streams in a multicast bouquet is set responsive to a maximum client delay time for tuning to a new resource stream.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Figure 1:
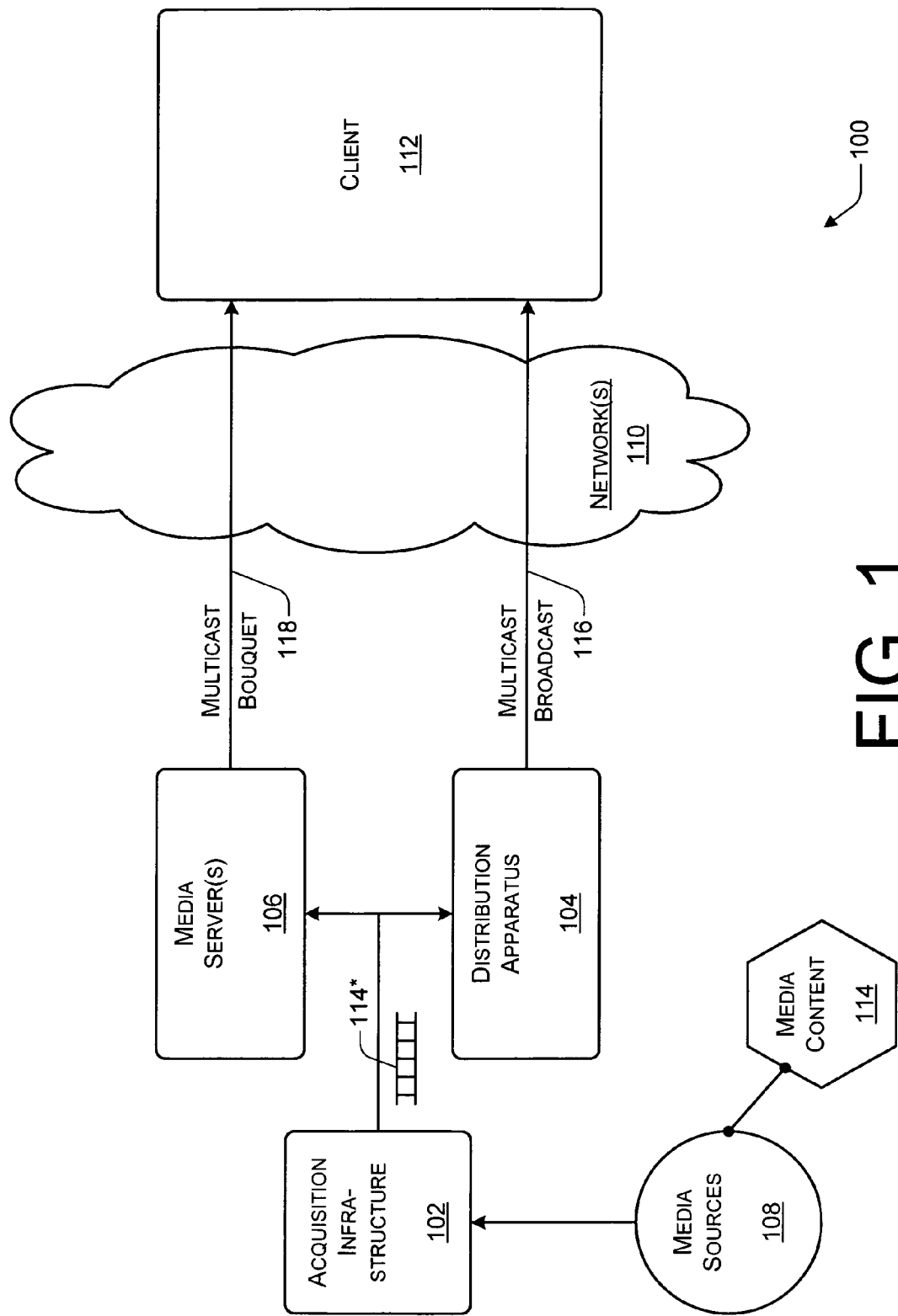
FIG. 1 is a block diagram of an example environment in which accelerated channel changing may be implemented for a client.

FIG. 1 is a block diagram of an example environment 100 in which accelerated channel changing may be implemented for a client 112. As illustrated, environment 100 includes a media-provider-oriented side, a client-oriented side, media sources 108, media content 114, and one or more networks 110. The provider-oriented side includes acquisition infrastructure 102, a distribution apparatus 104, and one or more media servers 106. The client-oriented side includes a client 112. Although only one client 112 is specifically illustrated, usually many (e.g., thousands to hundreds of thousands or more of) such clients 112 are simultaneously served by a single head-end installation (not explicitly shown).

Media sources 108 provide media content 114 to acquisition infrastructure 102. Media content 114 may be broadcast television, movies, premium channels, or multimedia files generally. Media content 114 usually comprises audio and/or visual (A/V) data, along with related control information. Media sources 108 may be broadcast or premium networks, movie studios, independent content producers, internet sites/servers, some combination thereof, and so forth.

Acquisition infrastructure 102 receives media content 114 from media sources 108. Frequently, media content 114 comprises a media (content) stream 114*. Acquisition infrastructure 102 forwards media stream 114* to distribution apparatus 104 and media server 106. In a described implementation, distribution apparatus 104 sends media stream 114* to client 112 live, or what is termed herein broadcast time. Media server 106 sends media stream 114* to client 112 delayed or at a post-broadcast time.

Although they are illustrated separately, one or more blocks may be co-located and/or implemented using the same or related device hardware. For example, media servers 106 and distribution apparatus 104 may be co-located at a single facility. Also, they may share, for instance, a router or a switch or other transmission resources. As another example, acquisition infrastructure 102 and distribution apparatus 104 may share processing resources.

Distribution apparatus 104 and media server 106 send media streams 114* to client 112 over or via one or more networks 110. Network 110 may be a cable network, a telephone network (e.g., a digital subscriber line (DSL) network), a satellite network, an internet, a local area network (LAN), a wide area network (WAN), some combination thereof, and so forth. Client 112 may be a set-top box or other television-type media device, a computer, a television, a portable device, some combination thereof, and so forth. An example general electronic device that may be used to realize a media server 106 and/or a client device 112 is described herein below with particular reference to FIG. 8.

As illustrated in example environment 100, distribution apparatus 104 and media server 106 utilize multicasting to send or flow media stream 114* to client 112. Specifically, distribution apparatus 104 flows a multicast broadcast 116 to client 112 for media stream 114* that is to be delivered at broadcast time. Media server 106 flows a multicast bouquet 118 to client 112. In a described implementation, multicast bouquet 118 comprises a group of time delayed media streams 114* that are coded into a segmented burst format and that are multicasted to client 112. As is described herein, client 112 may selectively join a multicast burst stream of multicast bouquet 118 to accelerate a digital channel change.

The term "multicast" may encompass, for example, certain types of Internet Protocol (IP) multicasting technologies, such as the Internet Group Management Protocol (IGMP), but it is not limited to any specific multicasting technologies. As broadly used herein, the term "multicasting" embraces and includes "broadcasting." Thus, multicasting may be effectuated using any protocol or standard. Examples include User Datagram Protocol (UDP) multicast technologies, IGMP multicast technologies, and so forth. Example multicasting commands that are described herein below comport with the IGMP.

Also, although much of the description herein specifically addresses or identifies media-type data streams, the principles described herein are applicable in general to data streams of any given resource type. Thus, resource streams may be multicasted from servers 106 and distribution apparatus 104 to client 112.

Figure 2:
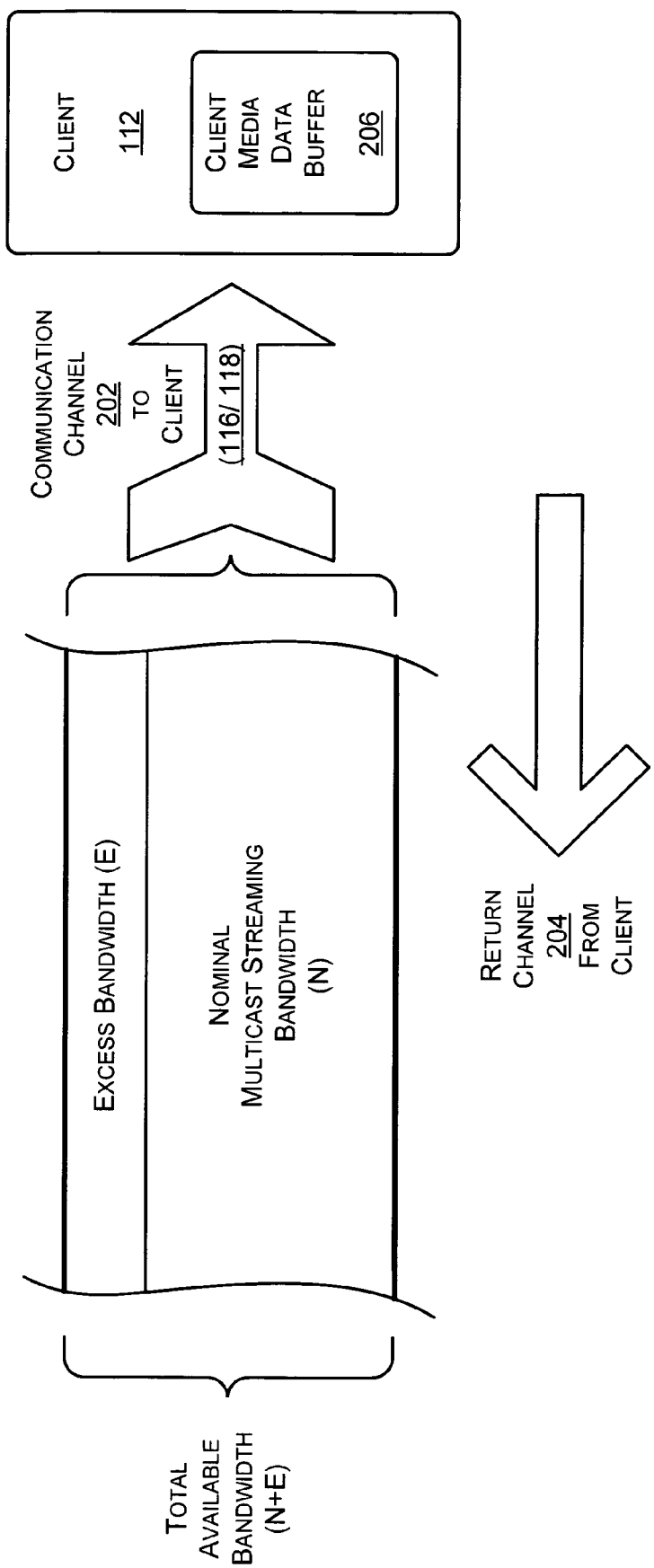
FIG. 2 is a block diagram illustrating an example of total bandwidth that is available for communicating with a client.

FIG. 2 is a block diagram illustrating an example of total bandwidth that is available for communicating with a client 112. A communication channel 202 exists between client 112 and a head-end having network nodes, such as distribution apparatus 104 and media server 106. In a described implementation, although multicast broadcast 116 and multicast bouquet 118 are shown separately in FIG. 1, they actually share a total available bandwidth of communication channel 202.

Thus, client 112 receives media streams from distribution apparatus 104 and/or media server 106 via communication channel 202, which may be realized at least partly by network 110 (of FIG. 1). A return channel 204 from client 112 to network nodes also exists. Upstream return channel 204 may be integrated with or separate from downstream communication channel 202. Return channel 204 may be used by client 112 to, for example, request new media streams, change channels, and so forth.

Client 112 includes a client media data buffer 206. Media data buffer 206 is described herein below with particular reference to FIG. 4. A given client 112 may utilize multiple communication channels 202 to, for example, simultaneously receive multiple media streams (e.g., when multiple tuners/decoders are present at client 112).

As illustrated, communication channel 202 comprises a total available bandwidth. This total available bandwidth includes a nominal multicast streaming bandwidth rate (N) and an excess bandwidth rate (E). Hence, the total available bandwidth includes the nominal multicast streaming bandwidth (N) and the excess bandwidth (E). Media stream 114*, when multicast normally, occupies up to the nominal multicast streaming bandwidth (N). The actual instantaneous bandwidth utilization typically fluctuates over time, but it is capped at the nominal rate (N). The excess bandwidth (E) may be used for other purposes.

As described herein, the excess data rate bandwidth (E) portion may be used to accelerate channel changing. With reference to FIG. 1, media streams 114* (e.g., movies, television channels, etc.) are flowed from distribution apparatus 104 to client 112 as multicast broadcast 116 using the nominal multicast streaming bandwidth (N). When a client 112 requests a channel change, excess bandwidth (E) is utilized to burst media data to client 112 in order to accelerate the channel change. In a described implementation, a multicast bouquet 118 is utilized to flow multiple multicast burst streams that are offset in time with respect to each other.

As is known, analog audio and visual information may be digitized. The digitization process entails some amount of encoding and then subsequent decoding. Many coding approaches have been developed. Examples include, but are not limited to, Moving Picture Expert Group (MPEG) coding, VC-1 coding, H.263 and H.264 coding, and so forth. Regardless of the coding approach employed, the encoding/decoding process often compresses/decompresses the information to some degree or level.

Coding approaches usually divide different frames of video into different frame types for coding purposes. An example is a division into three different frame types: infra (I) frames, predicted (P) frames, and bi-directional (B) frames. Infra frames may be more generally considered independent or key frames. Key frames are independent inasmuch as they may be decoded without reference to other frames. P frames and B frames reference one or more other frames and are therefore dependent frames inasmuch as they cannot be decoded independently.

As a consequence of these dependent frame types whose decoding is interdependent on the reception of other frames, the decoding of a media stream is started at an independent frame. When a client 112 requests receipt of a new media stream (e.g., requests a channel change), decoding does not start until an independent frame is received.

Modern coding techniques generally attempt to reduce the bandwidth size of a resulting bit stream as much as possible under the constrain of achieving a given desired level of presentation quality. One approach to increasing the compression level is to decrease the frequency of independent frames, which occupy the most bandwidth. Thus, the time duration between successive independent frames continues to increase as compression algorithms improve. Relatively recent coding techniques produce successive independent frames that are about 3-5 seconds apart. This is expected to be stretched to 10-12 seconds or longer between successive independent frames with newer codecs.

Waiting 10 seconds for a channel change, or even 3-5 seconds, is typically considered frustrating to television viewers if not genuinely unacceptable. An approach to counter this delay is to retrieve an independent frame from the past that may be decoded and displayed essentially immediately. Although the viewer is watching television approximately 5-15 seconds in the past (depending on implementation and/or coding scheme), the channel change is accelerated to a degree that is often considered to be effectively instantaneous to many television viewers.

Figure 3:
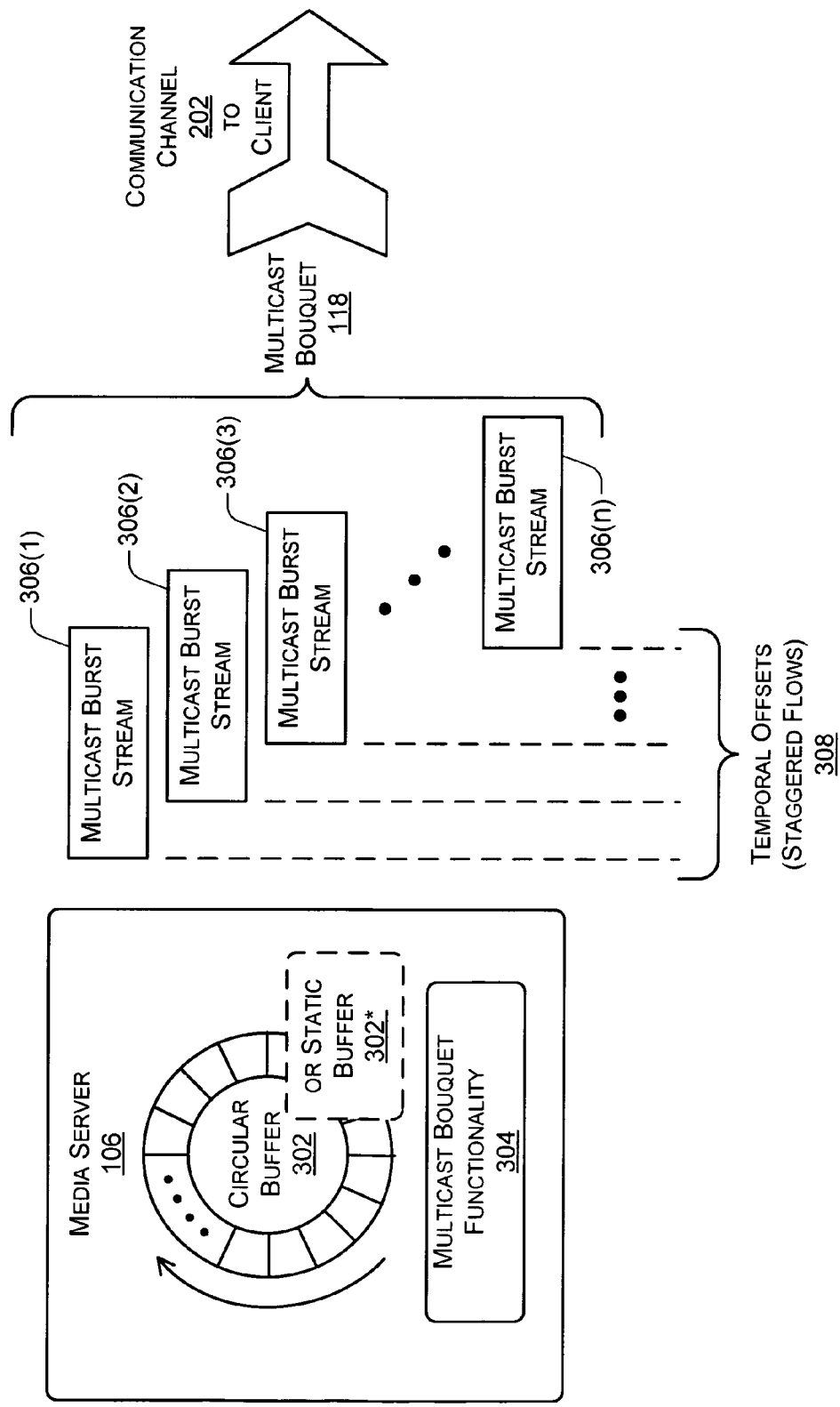
FIG. 3 is a block diagram example of a media server flowing a multicast bouquet along a communication channel to a client.

FIG. 3 is a block diagram example of media server 106 flowing a multicast bouquet 118 along a communication channel 202 to a client (not shown in FIG. 3). Media server 106 includes a circular buffer 302. Circular buffer 302 receives as input media content 114 from acquisition infrastructure 102. Circular buffer 302 temporarily stores media streams 114* so as to delay them. Because of the delay imposed by circular buffer 302, media server 106 can send a past independent frame to a client 112 that is requesting a channel change to accelerate the initial display and playing of the new channel.

The minimum length or size of circular buffer 302 is dependent on how far back in time an independent frame is going to be retrieved. Factors affecting this time period include the duration between independent frames, anticipated network delays, and so forth. Generally, circular buffer 302 is at least large enough to store a GOP's worth of media data for a media stream 114* that is to have tunings to it accelerated. An example relating to an amount of media data that may be stored is described herein below with regard to a client media data buffer and with particular reference to FIG. 4. Alternatively, a static buffer 302*, which is capable of providing VOD services, may be used to enable the retrieval of a past independent frame.

Media server 106 includes multicast bouquet functionality 304. Multicast bouquet functionality 304 implements multicast bouquet 118, including effecting related communications with client 112 and channel changing procedures. Thus, multicast bouquet functionality 304 produces multicast bouquet 118, which includes multiple multicast burst streams 306.

Specifically, multicast bouquet 118 includes "n" multicast burst streams 306, with "n" being an integer. As illustrated, multicast bouquet 118 includes multicast burst stream 306(1), multicast burst stream 306(2), multicast burst stream 306(3) . . . multicast burst stream 306(n). Each multicast burst stream 306 is delayed with respect to other multicast burst streams 306 by a given amount. Hence, there are temporal offsets 308 separating individual multicast burst streams 306. These temporal offsets 308 are addressed further herein below with particular reference to FIG. 7 in which an example of temporal offsets 308 are referred to as the maximum client delay time $T_{MCD}$. An example algorithm for setting the value of "n" is also described herein below with particular reference to FIG. 7.

Thus, multicast bouquet 118 comprises multiple multicast burst streams 306 that are flows staggered in time or temporally staggered flows. In a described implementation, temporal offsets 308 between consecutive multicast burst streams 306 are equivalent in length or duration. Also, temporally offset multicast burst streams 306 within a given multicast bouquet 118 are substantially identical. Substantially identical in this context indicates that humans would generally perceive the audio/visual content to be essentially identical, but ancillary data (e.g., control, rights management, etc. data types) may differ between two multicast burst streams 306. Examples of ancillary data include, but are not limited to, multicast addresses, temporal information, multicast bouquet indices, watermarking information, and so forth.

Figure 4:
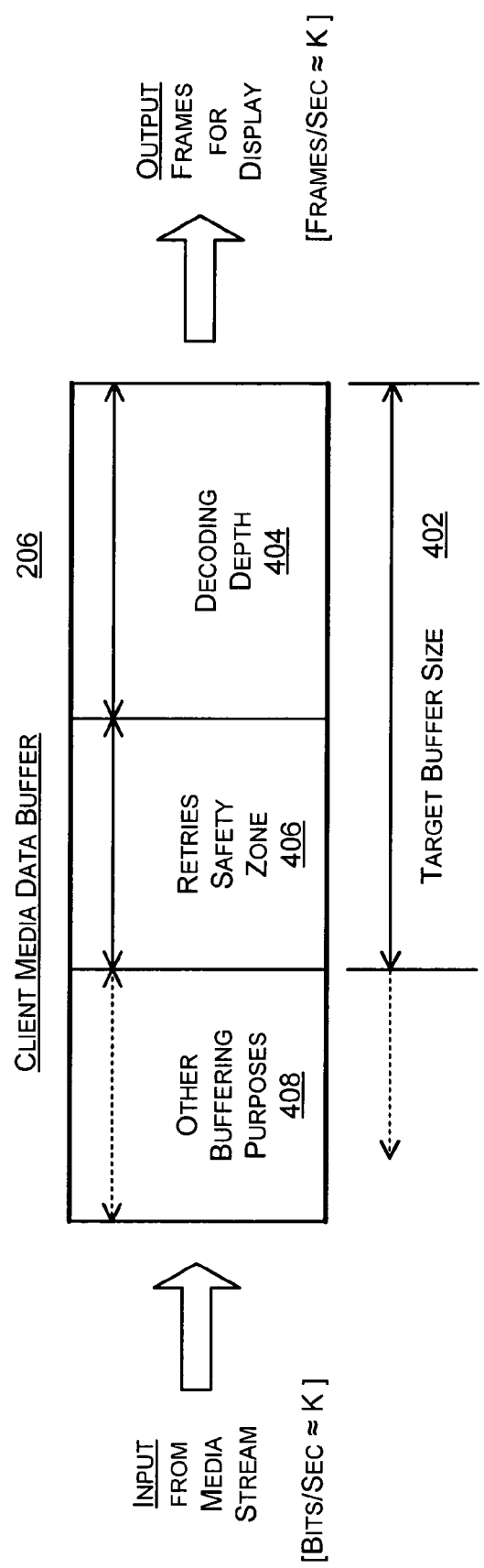
FIG. 4 is a block diagram of an example media data buffer for a client.

FIG. 4 is a block diagram of an example client media data buffer 206. As illustrated, media data buffer 206 receives input from a media stream (e.g., a media stream 114* of multicast broadcast 116 and/or multicast bouquet 118). Generally, the input data rate, or bits per second, is approximately constant for a given media stream over a sufficiently long period. Media data buffer 206 outputs frames for display. Thus, in this context, media data buffer 206 includes memory and processing capability (or at least access to image decoding processing capability) to consume the media data. Generally, the output data rate, or frames per second, is approximately constant.

A target buffer size 402 is illustrated as being determinable based on one or more factors. These factors include, for example, a decoding depth 404, a retries safety zone 406, and other buffering purposes 408. In a described implementation, target buffer size 402 includes decoding depth 404 and retries safety zone 406. However, target buffer size 402 may alternatively be based on fewer than two factors or more than two factors, as indicated by other buffering purposes 408.

Decoding depth 404 relates to the amount of data that may be used to decode a media stream given the dependent (e.g., predicted, bi-directional, etc.) nature of many coding algorithms. In other words, decoding is usually not started until the start of an entire group of pictures (GOP) is received, including the independent frame. A GOP typically refers to an independent frame and the succeeding non-independent frames prior to the next independent frame.

Retries safety zone 406 relates to the amount of data or time that is selected to ensure that any packets that are not properly received initially may be separately requested and received in time for decoding within the decoding depth 404. These data and packets are referred to herein as retry data and packets. The desired duration for the retry safety zone 406 and the corresponding size of this logical part of media data buffer 206 are dependent on, for example, expected network communication latencies.

Regardless of the nature or number of reasons for buffering the media data, target buffer size 402 represents the desired amount of media data that is to be present within media data buffer 206. Thus, at least when client 112 is receiving a media stream at a nominal bit rate (N), an amount of media data equal to target buffer size 402 is to be received by a client 112 prior to the presentation of a frame derived from such received media data.

Figure 5:
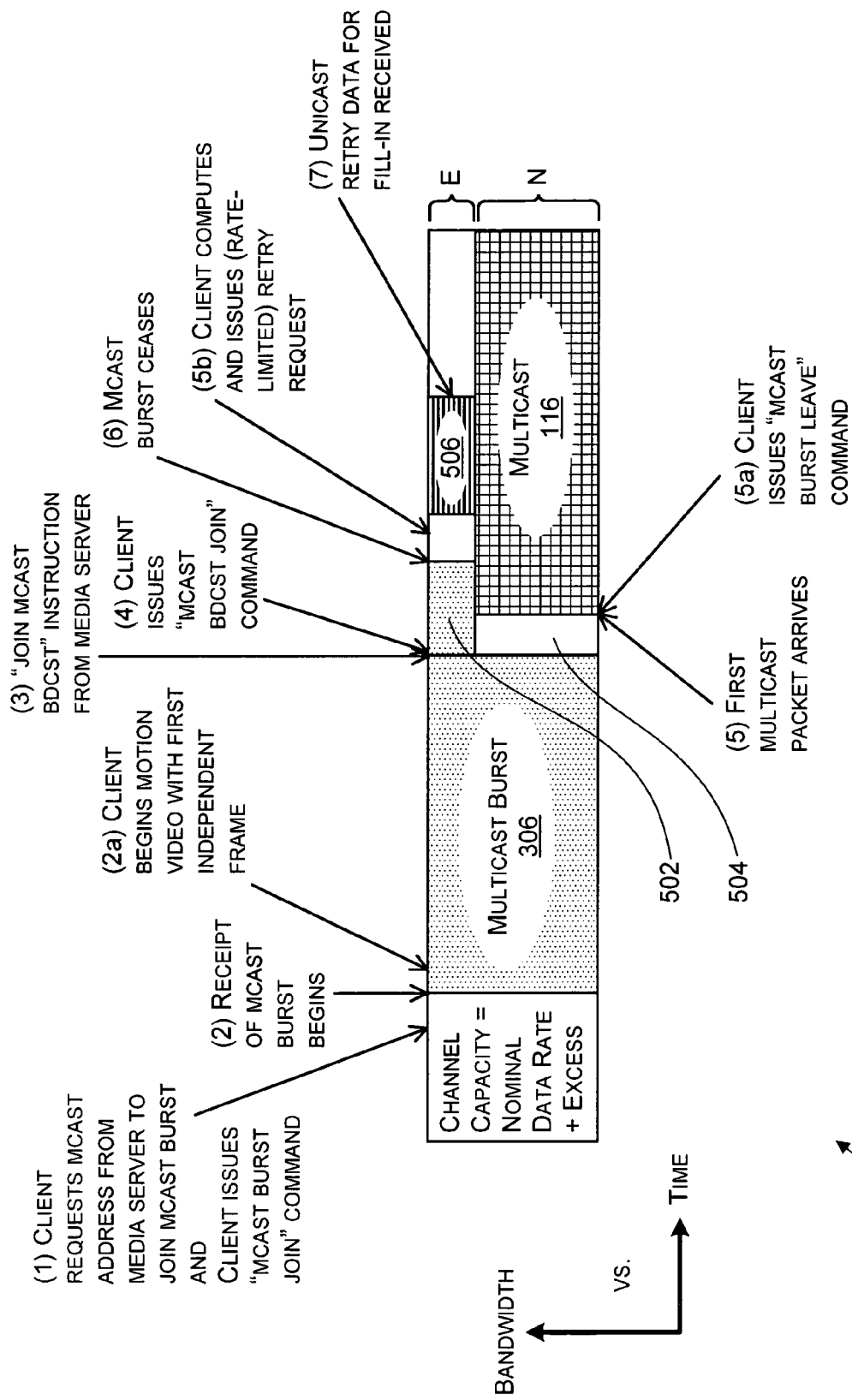
FIG. 5 illustrates an example bandwidth utilization graph of a communications channel that propagates a multicast burst and a multicast stream.

FIG. 5 illustrates an example bandwidth utilization graph 500 of a communications channel that propagates a multicast burst 306 and a multicast stream 116. Bandwidth utilization graph 500 graphs time along the abscissa/horizontal axis versus bandwidth along the ordinate/vertical axis. The total channel capacity is the nominal data rate (N) plus the excess data rate (E).

Generally, several media data portions occupy the channel at different times. Specifically, bandwidth utilization graph 500 includes multicast burst 306, multicast stream 116, and retry data 506. Multicast burst stream 306 occupies substantially all of the total channel capacity, which is the nominal data rate (N) plus the excess data rate (E). Multicast stream 116 occupies up to substantially all of the total amount of the nominal data rate (N). Over time, the bandwidth consumed by multicast stream 116 fluctuates depending on the demands of the underlying data resource being streamed, but it is limited to the nominal data rate (N) at any given moment. Retry data 506 occupies up to the excess data rate (E).

Bandwidth block 502 corresponds to a portion of multicast burst 306 that occupies the fraction of the channel that approximately equals the excess capacity (E). The excess data rate portion of multicast burst 306 enables additional data to be burst to client 112 without risking an overload of the channel when multicast stream 116 is expected soon. This excess data rate portion of multicast burst 306 as represented by bandwidth block 502 is optional.

Bandwidth block 504 corresponds to an empty or unutilized portion of graph 500 inasmuch as no data is being communicated within bandwidth block 504. Bandwidth block 504 has a height that matches the nominal data rate (N)

and indicates that the channel is being cleared or prepped to make room for the impending arrival of multicast stream 116. Bandwidth block 504 has a width that matches a time delay for joining a multicast stream, specifically multicast broadcast stream 116 that is flowed from distribution apparatus 104.

At (1), the client (e.g., client 112) requests a multicast address from a media server (e.g., media server 106) to join a multicast burst (e.g., multicast burst stream 306). This request from the client may be made responsive to user input, such as a channel change command to change channels, a general tuning command to stream different media, and so forth. After the correct multicast address is known, the client issues a "multicast burst join" command.

At (2), the receipt of the multicast burst stream begins. At (2a), the client begins producing motion video upon receipt of the first independent frame. In a described implementation, each multicast burst 306 begins with an independent frame to expedite the initial display of video at the client.

At (3), the media server has completed sending the portion of the multicast burst that consumes the entire bandwidth channel. The client has been playing video and thus emptying media data buffer 206 since (2a). The media data buffer is emptied approximately at the nominal data rate (N) of the desired media stream. Consequently, the client's buffer now holds an amount of data that is approximately equal to the excess data rate (E) multiplied by the length of the multicast burst between points (2) and (3). This amount of data, possibly after including the data of bandwidth block 502, can be sufficient to maintain target buffer size 402, even after occurrence of the unutilized bandwidth block 504.

At (3), the client receives a "join multicast broadcast" instruction from the media server. This instruction indicates to the client that at least the full bandwidth portion of multicast burst 306 is concluding. The full bandwidth portion of the multicast burst may conclude immediately or it may be continued for a duration calculated to equal the (e.g., minimum) multicast join time involved in the client's joining a multicast broadcast for the requested stream.

At (4), in response to receipt of the "join multicast broadcast" instruction from the media server, the client issues a "multicast broadcast join" command to distribution apparatus 104 in order to join multicast broadcast 116. After a join delay time period represented by the width of bandwidth block 504, at (5) the first multicast broadcast packet for multicast stream 116 arrives at the client.

At (5a), the client issues to the media server a "multicast burst leave" command to indicate an intention to leave multicast burst stream 306. At (6), receipt of multicast burst stream 306 ceases. At (5b), the client computes missing data, which is especially likely to occur during the transition between multicast burst stream 306 and multicast broadcast stream 116. The client issues (e.g., rate-limited) retry request(s) based on the computed missing data.

At (7), the media server responds to the rate-limited retry requests with retry data 506 that is unicast from media server 106 to client 112. Upon receipt of the unicast retry data, the client fills in holes of the media data within media data buffer 206 prior to decoding.

Figure 6:
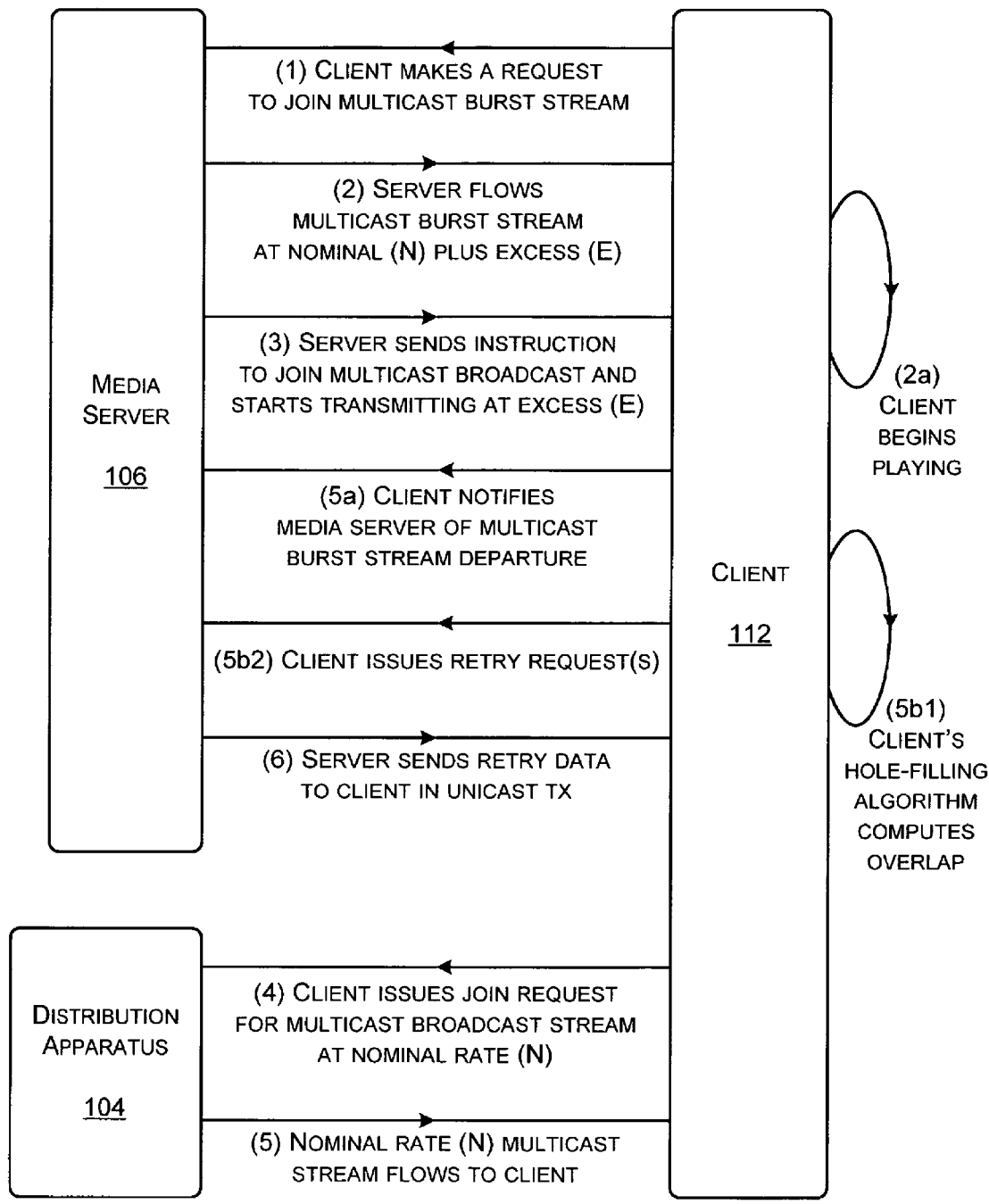
FIG. 6 is an example sequence diagram of actions and communications between a client and a media server and between the client and a distribution apparatus.

FIG. 6 is an example sequence diagram 600 of actions and communications between a client 112 and a media server 106 and between client 112 and a distribution apparatus 104. The operations in FIG. 6 are designated by parenthetical numerals (1)-(6) that correspond to those in the bandwidth utilization graph 500 of FIG. 5. The order and nature of the illustrated and described operations are by way of example only. Other implementations of accelerated channel change may apply the operations in a somewhat different order, and/or they may include additional types of operations, and/or they may omit one or more of the operations.

At (1), the client makes a request of the media server to join a multicast burst stream. The media server determines which of multiple multicast burst streams is next to start a new multicast burst segment with an initial independent frame. As is described herein above with particular reference to FIG. 3 and further herein below with particular reference to FIG. 7, the media server flows multiple multicast burst streams 306 as a multicast bouquet 118. In this example implementation, the media server is responsible for determining which multicast burst stream 306 is associated with the next most temporally proximate independent frame.

At (2), the media server flows the selected multicast burst stream to the client at a bandwidth equal to the nominal data rate (N) plus the excess capacity data rate (E). At (2a), the client begins playing the video after a complete independent frame has been received and decoded. Because the multicast burst stream exceeds the nominal data rate (N) by the excess date rate (E), the client can safely begin decoding the media stream and playing the media before receiving data equaling target buffer size 402.

At (3), the media server sends an instruction to the client to join the multicast broadcast for the selected channel. The media server also decreases the transmission rate and begins flowing the multicast burst at the excess data rate (E). At (4), in response to receiving the join instruction from the media server, the client issues a join request to the distribution apparatus to receive the multicast broadcast stream at the nominal date rate (N).

At (5), the multicast broadcast stream is flowed from the distribution apparatus to the client at the nominal data rate (N). At (5a), the client notifies the media server that it is departing the multicast burst stream. At (5b1), the client employs a hole-filling algorithm to determine what data of the media stream is missing. The hole-filling algorithm is applied, in particular, to compute data holes in the region around the transmission overlap.

At (5b2), the client issues one or more retry requests, which are directed to the missing data, to the media server based on the results of the hole-filling algorithm. At (6), the media server responds to the data requests by sending the retry data to the client in a unicast transmission.

Figure 7:
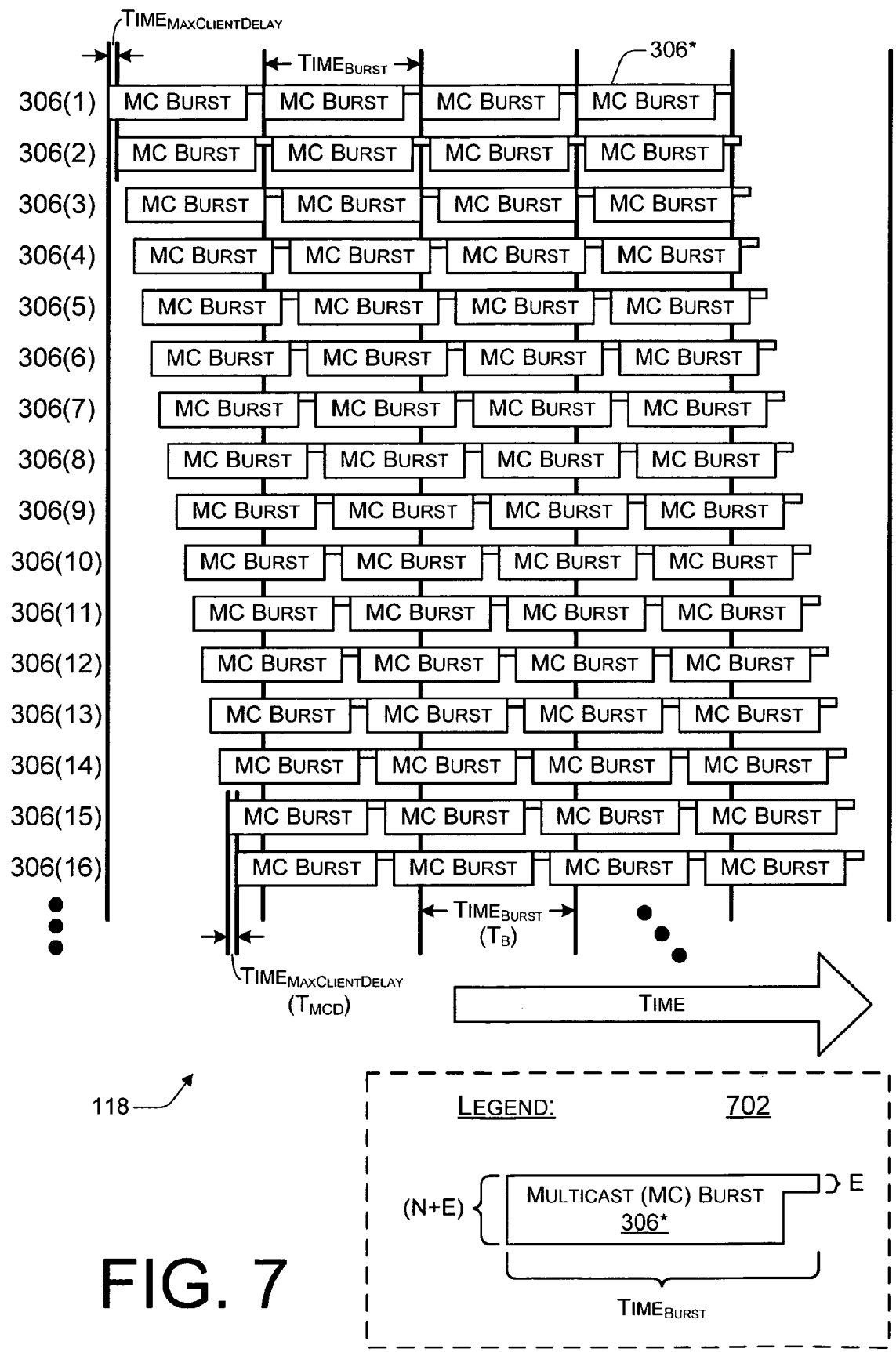
FIG. 7 illustrates an example multicast bouquet having multiple multicast burst streams.

FIG. 7 illustrates an example multicast bouquet 118 having multiple multicast burst streams 306. As indicated by legend 702, each example multicast burst segment 306* is of a burst length equal to $Time_{Burst}$ or $T_B$. A first portion of multicast burst segment 306* consumes a bandwidth equal to the nominal data rate (N) plus the excess data rate (E). A second portion consumes a bandwidth equal to the excess data rate (E). The burst time $T_B$ may or may not include the second transmission portion at the excess bandwidth (E), depending on implementation and desired operational parameters.

As illustrated, multicast bouquet 118 includes sixteen (16) multicast burst streams 306(1) to 306(16). However, more or fewer multicast burst streams 306 may alternatively comprise each repeating multicast bouquet 118. Each multicast burst stream 306 is temporally offset with respect to adjacent multicast burst streams 306 (i.e., with respect to both a preceding and a succeeding multicast burst stream 306). This temporal offset is denoted in FIG. 7 by $Time_{MaxClientDelay}$ or $T_{MCD}$. Time increases from left to right.

The temporal offset is thus related to the maximum client delay time ($T_{MCD}$) that is considered permissible when a user requests a channel change. Although any time period may be selected depending on viewer and/or customer preferences, selecting a value on the order of several hundred milliseconds (e.g., 300-500 milliseconds) likely enables a channel change that viewers consider essentially instantaneous. Of course, shorter time periods, such as 50 milliseconds or less, for the maximum client delay time $T_{MCD}$ can produce faster channel changes if network and other hardware and software infrastructure are capable of implementing the shorter time period.

The length or size of each multicast burst segment 306* is the burst time or $T_B$. The burst time $T_B$ is set based on a target buffer size 402 (of FIG. 4) and the size of the excess bandwidth (E). The product of the burst time $T_B$ and the excess data rate (E) [$T_B \times E$] is the amount of extra information deposited into client media data buffer 206 (of FIGS. 2 and 4) at the end of one multicast burst segment 306* given that client media data buffer 206 is being drained at approximately the nominal data rate (N). Hence, disregarding the effects of bandwidth blocks 502 and 504 (of FIG. 5), the length of the burst time $T_B$ is set equal to the target buffer size (TBS) divided by the excess data rate (E). In short, $T_B$=TBS/E.

The number of multicast burst streams 306 in a multicast bouquet 118 reflects the number of duplicated multicast burst streams 306 that a media server 106 produces for a given channel in order to accelerate channel changes to that given channel. Thus, the number of multicast burst streams 306 in a multicast bouquet 118 represents the number of multicast burst segments 306* that are started during each burst time $T_B$. The number of multicast burst streams 306, per multicast bouquet 118, is set responsive to the burst time $T_B$ and the maximum client delay time $T_{MCD}$.

Specifically, in a described implementation, the number of multicast burst streams 306 is equal to the burst time $T_B$ divided by the maximum client delay time $T_{MCD}$ [No of Mcast Burst Streams=$T_B/T_{MCD}$]. The calculations are simplified when $T_{MCD}$ is at least smaller than, if not an actual divisor of, a GOP duration length $T_{GOP}$. By way of clarifying example only, if the burst time $T_B$=7500 milliseconds and the maximum client delay time $T_{MCD}$=500 milliseconds, media servers 106 produce 15 multicast burst streams 306 per channel. This can effectively enable a television system to provide accelerated channel change using, e.g., dozens of multicast streams instead of thousands of unicast streams per channel while simultaneously providing television services to tens of thousands of viewers.

Figure 8:
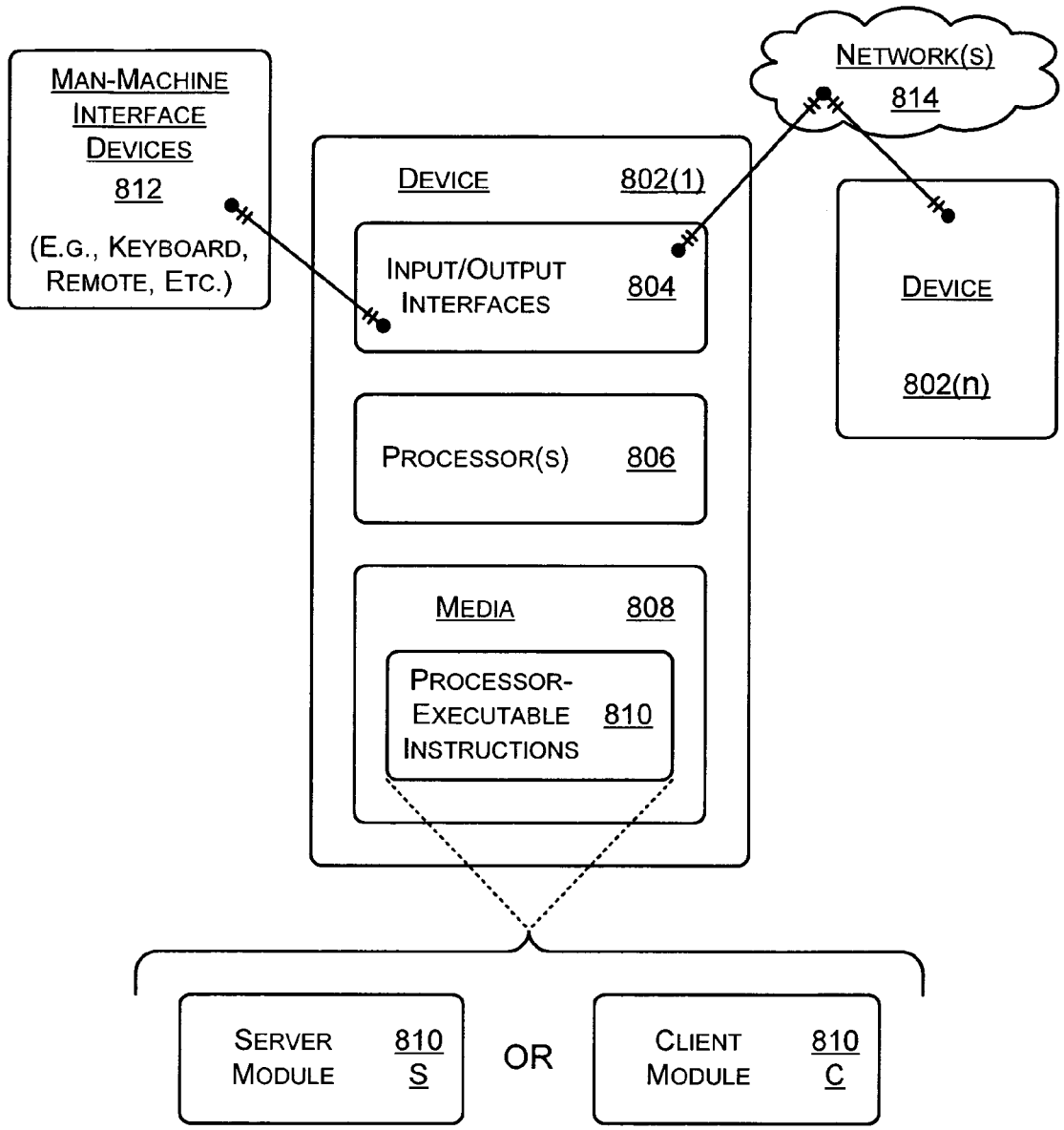
FIG. 8 is a block diagram of an example device that may be employed in conjunction with accelerated channel change.

FIG. 8 is a block diagram of an example device 802 that may be employed in conjunction with accelerated channel changing. For example, distribution apparatus 104, media server 106, and/or client 112 may be implemented with a device 802. Thus, a properly configured device 802 may possess the features and/or perform the operations and actions described herein.

In a described implementation, multiple devices (or machines) 802 are capable of communicating across one or more networks 814, such as network(s) 110 (of FIG. 1). As illustrated, two devices 802(1) and 802(n) are capable of engaging in communication exchanges, including those relating to both unicast and multicast communications, via network 814.

Although two devices 802 are specifically shown, one or more than two devices 802 may be employed, depending on implementation. For example, media servers 106 may comprise a server farm with multiple devices 802, with each server farm likely servicing many clients 112. The devices 802 that are used to realize each media server 106 may differ from the devices 802 that are used to realize clients 112. For example, media servers 106 often possess more memory, have a greater processing capability, and/or provide a larger communication bandwidth than clients 112.

Generally, device 802 may represent a server device; a storage device; a workstation or other general computer device; a router, switch, or other transmission device; a so-called peer in a distributed peer-to-peer (P2P) network; a set-top box or other television device; a personal digital assistant (PDA) or mobile appliance; some combination thereof; and so forth. In an example implementation, however, device 802 comprises a commodity server on the service provider side and a set-top box on the client side. As illustrated, device 802 includes one or more input/output (I/O) interfaces 804, at least one processor 806, and one or more media 808. Media 808 includes processor-executable instructions 810. Although not specifically illustrated, device 802 may also include other components.

In a described implementation of device 802, I/O interfaces 804 may include (i) a network interface for communicating across network(s) 814, (ii) a display device interface for displaying information on a display screen, (iii) one or more man-machine device interfaces, and so forth. Examples of (i) network interfaces include a network card, a modem, one or more ports, and so forth. Examples of (ii) display device interfaces include a graphics driver, a graphics card, a hardware or software driver for a screen/television or printer, and so forth. Examples of (iii) man-machine device interfaces include those that communicate by wire or wirelessly to man-machine interface devices 812 (e.g., a keyboard, a mouse or other graphical pointing device, a remote control, etc.).

Generally, processor 806 is capable of executing, performing, and/or otherwise effectuating processor-executable instructions, such as processor-executable instructions 810. Media 808 is comprised of one or more processor-accessible media. In other words, media 808 may include processor-executable instructions 810 that are executable by processor 806 to effectuate the performance of functions by device 802.

Thus, realizations for accelerated channel changing may be described in the general context of processor-executable instructions. Generally, processor-executable instructions include routines, programs, applications, coding, modules, protocols, objects, interfaces, components, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

Processor(s) 806 may be implemented using any applicable processing-capable technology. Media 808 may be any available media that is included as part of and/or accessible by device 802. It includes volatile and non-volatile media, removable and non-removable media, and storage and transmission media (e.g., wireless or wired communication channels). For example, media 808 may include an array of disks for longer-term mass storage of processor-executable instructions, random access memory (RAM) for shorter-term storage of instructions that are currently being executed, flash memory for medium to longer term storage, and/or link(s) on network 814 for transmitting communications, and so forth.

As specifically illustrated, media 808 comprises at least processor-executable instructions 810. Generally, processor-executable instructions 810, when executed by processor 806, enable device 802 to perform the various functions described herein, including those that are illustrated in flow diagrams 900, 1000, and 1100 (of FIGS. 9, 10, and 11, respectively) and those logical components and operations illustrated in FIGS. 3-7.

By way of example only, processor-executable instructions 810 may include all or part of a server module 810S and/or a client module 810C. Example actions for such processor-executable modules are described herein below with particular reference to FIGS. 9-11.

Figure 9:
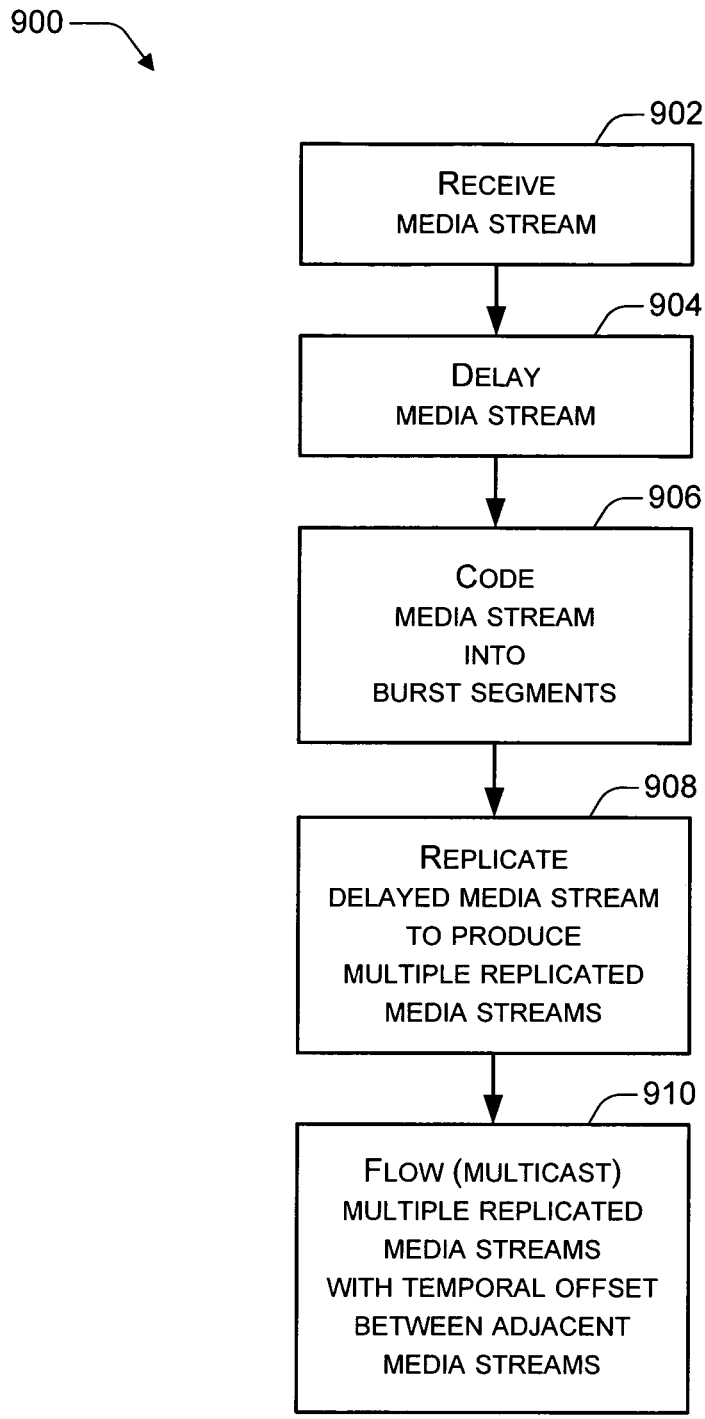
FIG. 9 is a flow diagram that illustrates an example of a method for server module processing with respect to implementing accelerated channel change.

FIG. 9 is a flow diagram 900 that illustrates an example of a method for server module processing with respect to implementing accelerated channel change. Flow diagram 900 includes five (5) blocks 902-910. Although the actions of flow diagram 900 may be performed in other environments and with a variety of hardware and software combinations, a device 802 that is described herein above with particular reference to FIG. 8 may be used to implement the method of flow diagram 900. For example, server module 810S may implement the described actions. Other figures that are described herein above are referenced to further explain the method.

At block 902, a media stream is received. For example, a media server 106 may receive a media stream 114* from acquisition infrastructure 102. At block 904, the received media stream is delayed. For example, media server 106 may use a circular buffer 302 to delay media stream 114* by an amount that is equal to at least the length of a GOP so that a past independent frame is always available for transmission to a client 112.

At block 906, the media stream is coded into burst segments. For example, media stream 114* may be coded into multicast burst segments 306*. Each multicast burst segment 306* includes at least a portion of media data that is transmitted at a greater than nominal rate (>N) (e.g., N+E). Each may also include other portions; for instance, each multicast burst segment 306* may also include a portion that is transmitted at the excess data capacity rate (E). The coding may involve, for example, a transformation of a media stream from a constant maximum nominal rate to segments having a higher transmission rate. The coding may also merely involve preparing to transmit the media stream at a higher than nominal rate without performing any transformation. The coding (of block 906) may be performed prior to the delaying (of block 904).

At block 908, the delayed media stream is replicated to produce multiple replicated media streams. For example, media server 106 may replicate a temporally-delayed version of media stream 114* to create a multicast bouquet 118 having multiple multicast burst streams 306. Each replicated media stream may be substantially identical to every other media stream of a given multicast bouquet as described herein above. The number of multicast burst streams that are replicated for a given multicast bouquet may be set responsive to, for instance, the burst time for each burst segment and the maximum acceptable client delay time.

At block 910, multiple replicated media streams are flowed or multicast with a temporal offset between temporally adjacent media streams. For example, the multiple multicast burst streams 306 of multicast bouquet 118 may be flowed or multicast toward one or more clients 112 with a temporal offset 308 between temporally adjacent multicast burst streams 306. The temporal offset may be established based on the maximum acceptable client delay time for tuning to a channel.

Figure 10:
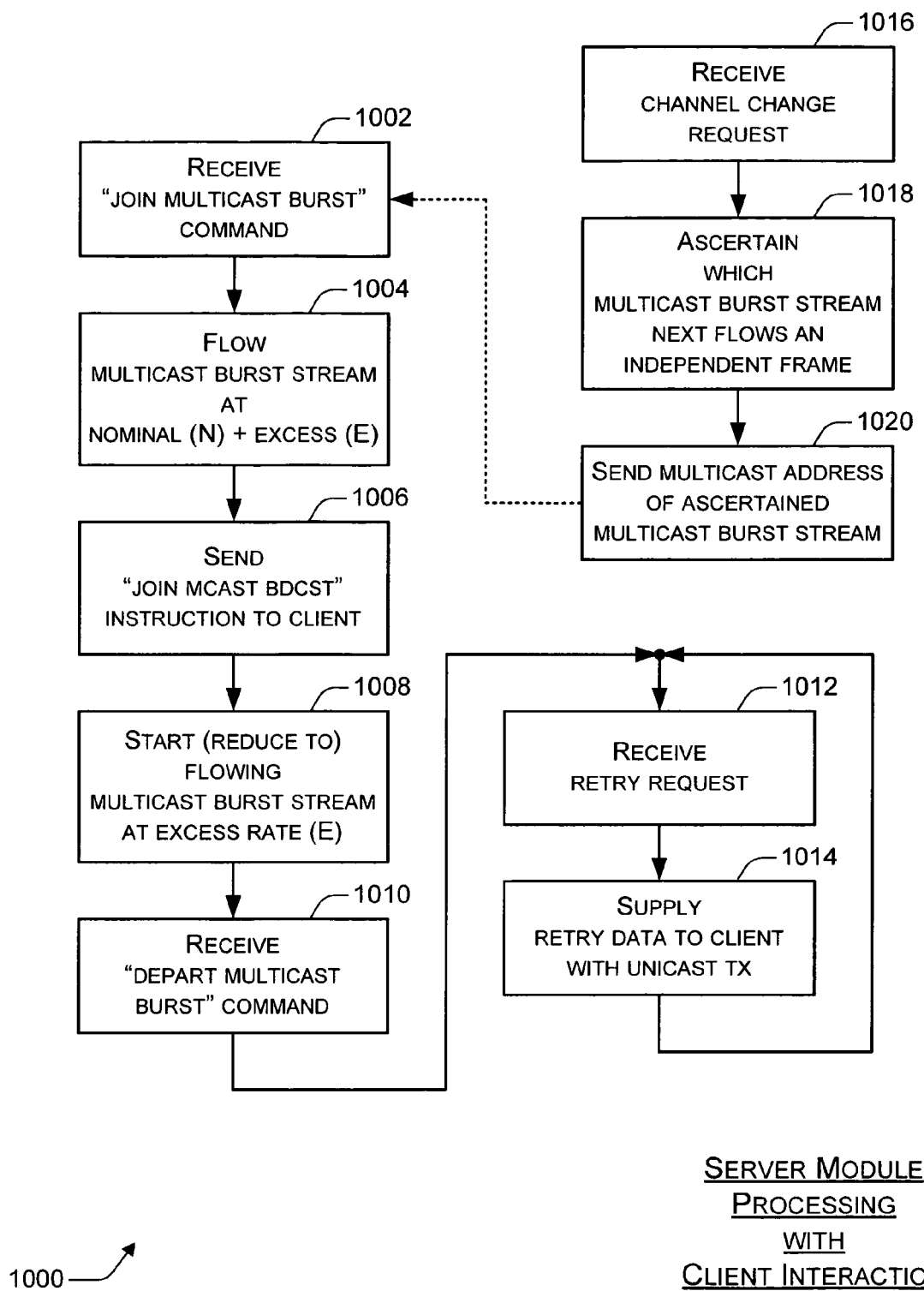
FIG. 10 is a flow diagram that illustrates an example of a method for server module processing when interacting with a client with respect to implementing accelerated channel change.

FIG. 10 is a flow diagram 1000 that illustrates an example of a method for server module processing when interacting with a client with respect to implementing accelerated channel change. Flow diagram 1000 includes ten (10) blocks 1002-1020. Although the actions of flow diagram 1000 may be performed in other environments and with a variety of hardware and software combinations, a device 802 that is described herein above with particular reference to FIG. 8 may be used to implement the method of flow diagram 1000. For example, server module 810S may implement the described actions. Other figures that are described herein above are referenced to further explain the method.

At block 1002, a "join multicast burst" command is received from a client at the server. At block 1004, a multicast burst stream is flowed at a greater than nominal data rate (e.g., a nominal plus excess (N+E) data rate) to the client. At block 1006, a "join multicast broadcast" instruction is sent to the client. At block 1008, the server starts (reduces the data rate to) flowing the multicast burst stream at a lower than nominal data rate (e.g., at a data rate that consumes no more than the excess channel capacity (E)). The order of the actions of blocks 1006 and 1008, for example, may be swapped.

At block 1010, the server receives a "depart multicast burst" command from the client. At block 1012, the server receives a retry request from the client for missing data. The retry data may be identified, for example, using packet numbers, sequence numbers, some combination thereof, and so forth. At block 1014, the server supplies the client with the requested retry data in a unicast transmission. The actions of blocks 1012 and 1014 are repeated for any holes that are created during the transition by the client from the multicast burst stream of the server to the multicast broadcast stream of "standard" distribution apparatus.

In a described implementation, when the server receives the "join multicast burst" command from the client (at block 1002), the command includes a multicast address of the multicast burst stream to which the client is joining. The client determines this multicast address using known information or by requesting it from the server. The former approach is described further herein below with particular reference to FIG. 11. The latter is described below with reference to blocks 1016-1020.

At block 1016, the server receives a channel change request (or, more generally, a request to tune to a new resource stream) from a client. At block 1018, the server ascertains which multicast burst stream next flows an independent frame. At block 1020, the server sends the multicast address of the ascertained multicast burst stream back to the client, where the client can use it when formulating a "join multicast burst" command.

Figure 11:
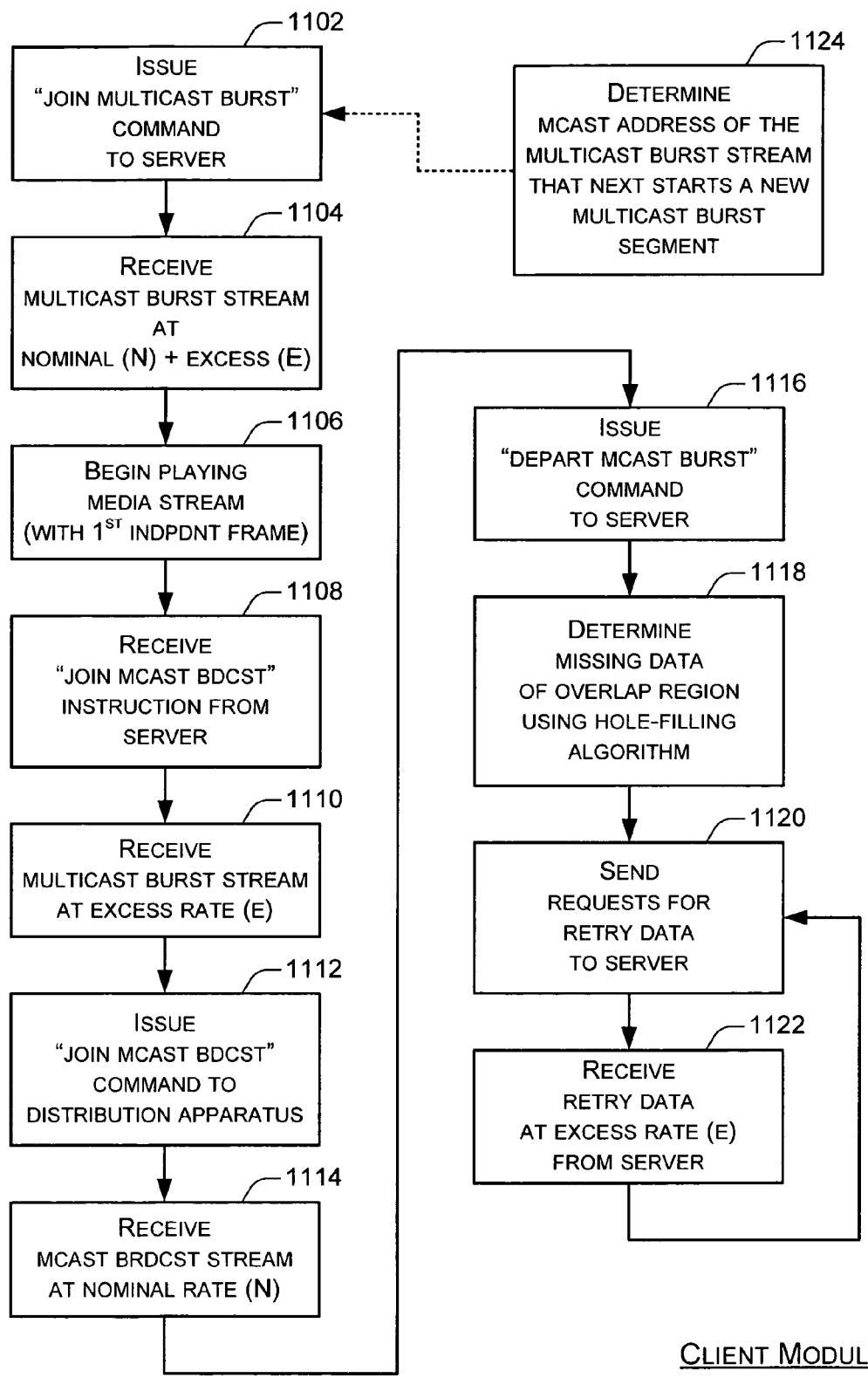
FIG. 11 is a flow diagram that illustrates an example of a method for client module processing with respect to implementing accelerated channel change.

FIG. 11 is a flow diagram 1100 that illustrates an example of a method for client module processing with respect to implementing accelerated channel change. Flow diagram 1100 includes twelve (12) blocks 1102-1124. Although the actions of flow diagram 1100 may be performed in other environments and with a variety of hardware and software combinations, a device 802 that is described herein above with particular reference to FIG. 8 may be used to implement the method of flow diagram 1100. For example, client module 810C may implement the described actions. Other figures that are described herein above are referenced to further explain the method.

At block 1102, the client issues a "multicast burst join" command to a server. At block 1104, the client receives a multicast burst stream at a higher than nominal data rate as compared to the underlying media stream. This higher than nominal data rate may be, for example, approximately equal to the nominal data rate (N) plus an excess data capacity rate (E). At block 1106, the client begins playing the underlying media stream upon receipt of the first independent frame.

At block 1108, the client receives a "join multicast broadcast" instruction from the server. At block 1110, the client receives the multicast burst stream at the excess data rate (E) from the server. At block 1112, the client issues a "join multicast broadcast" command to distribution apparatus (e.g., distribution apparatus 104).

An example alternative omits the excess data rate (E) portion of the multicast burst stream. Also, the issuance of the "join multicast broadcast" command (of block 1112) may precede the data rate reduction as represented by the receipt of the multicast burst stream at the excess data rate (E) (at block 1110).

At block 1114, the client receives the multicast broadcast stream from the distribution apparatus at the nominal data rate (N). At block 1116, the client issues a "depart multicast burst" command to the server.

At block 1118, the client determines what data is missing in the overlap region between multicast transmissions using a hole-filling algorithm. At block 1120, the client sends request(s) for retry data to the server responsive to the missing data determination (i.e., when there is missing data). At block 1122, the client receives retry data at the excess data rate (E) from the server in one or more unicast transmissions. The requests and receptions (of blocks 1120 and 1122) continue until the missing data is filled in. The client may also continue to request retry data for data that is missing during the ongoing reception of the multicast broadcast stream.

As described above, the client determines a multicast address for a multicast burst stream that is to be joined with the "multicast burst join" command (of block 1102). The determination that is effected by asking the server for a multicast address is described herein above with reference to FIG. 10. The determination may also be made by the client using known information. This approach is described with reference to block 1124.

At block 1124, the client determines the multicast address of the multicast burst stream that next starts a new multicast burst segment. In this example, instead of determining the multicast address via a request to the server, the client uses known information. More specifically, but by way of example only, the client is informed that there are "Y" multicast burst streams for a particular channel that is to be tuned to. Then the client itself, with this knowledge, can tune directly to the multicast burst stream without contacting the server. The multicast address can be determined, for instance, by calculating the offset in time against a mutual reference (e.g., T=midnight today) modulo the number of multicast burst streams, and then that number is used as the 4th byte in the multicast address. For instance, the final multicast address for the multicast burst stream may be the address published in the already-existing client-to-server map in which the 4th byte is replaced by the calculated offset value.

Utilizing a multicast bouquet having multiple multicast burst streams for a given channel can be implemented in different manners to accelerate channel changing. For example, it may be implemented constantly for each channel. Alternatively, it may be implemented selectively depending, for instance, on expected or actual viewer usage. There is a trade off between the number of media servers that are provisioned to provide the multicast accelerated channel change techniques described herein and the investment in network resources demanded by multicasting, which often requires more and/or more sophisticated routers and switches. Selectively engaging the multicast bouquets on a per channel basis and/or at different times may facilitate the balancing of these two competing costs.

Several selective implementation examples are provided below. First, channels that are known to be high-volume may be statically provisioned to operate channel changes thereto using a multicast bouquet technique. Second, certain events (e.g., programs and/or special media streams) that are known or expected to have a high-volume viewership may be marked as candidates for statically implementing multicast bouquets. During these times, a multicast bouquet is implemented for the corresponding changes. Adjacent and surrounding channels may also be so-marked because of the likelihood of up/down channel surfing.

Third, the implementation may be dynamic. For instance, a media server may monitor the number of (e.g., unicast-effected) channel changes in a given time period. If the number of channel change requests exceeds a preset number within a predetermined time period, the program and channel is determined to be high-volume, and a multicast bouquet having multiple multicast burst streams is created to accelerate channel changes thereto. It may also be dynamically implemented for proximate channels.

The devices, actions, aspects, features, functions, procedures, modules, data structures, protocols, architectures, components, etc. of FIGS. 1-11 are illustrated in diagrams that are divided into multiple blocks. However, the order, interconnection, interrelationship, layout, etc. in which FIGS. 1-11 are described and/or shown are not intended to be construed as a limitation, and any number of the blocks can be modified, combined, rearranged, augmented, omitted, etc. in any manner to implement one or more systems, methods, devices, procedures, media, apparatuses, APIs, arrangements, etc. for accelerated channel change.

Although systems, media, devices, methods, procedures, apparatuses, techniques, schemes, approaches, arrangements, and other impementations have been described language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. A method comprising:
   replicating a media stream to provide a multicast bouquet having multiple burst streams, wherein a number of the multiple burst streams of the multicast bouquet is set at least in part according to a desired channel change delay time; and
   multicasting the multiple burst streams of the multicast bouquet via a communication channel, wherein the multiple burst streams are separated in the communication channel by a temporal offset time shorter than a duration time of a group of pictures (GOP) of the media stream, and wherein individual burst streams comprise:
   at least one burst segment portion transmittable at a first rate for a first time period, wherein the first rate comprises a nominal bandwidth rate of the communication channel and an excess bandwidth rate of the communication channel; and
   at least one other burst segment portion transmittable at a second rate for a second time period, wherein the second rate comprises the excess bandwidth rate of the communication channel and the second time period is subsequent to the first time period,
   wherein the temporal offset time is set responsive to the desired channel change delay time.

2. The method of claim 1, wherein the media stream is designed to be consumed by a decoding process at the nominal bandwidth rate.

3. The method of claim 1, further comprising:
   prior to the replicating, receiving the media stream; and
   delaying the media stream by a delay time that equals or exceeds the duration time of the GOP of the media stream, wherein the delaying is performed after the receiving and prior to the multicasting.

4. The method of claim 1, wherein the multiple burst streams are multicast using Internet Group Management Protocol (IGMP).

5. The method of claim 1, wherein the multiple burst streams are substantially identical.

6. A system comprising:
a server module configured to:
replicate a media stream to provide a multicast bouquet having multiple burst streams, wherein a number of the multiple burst streams of the multicast bouquet is set at least in part according to a channel change delay time; and
multicast the multiple burst streams of the multicast bouquet via a communication channel, wherein the multiple burst streams are separated in the communication channel by a temporal offset time shorter than a duration time of a group of pictures (GOP) of the media stream, and wherein individual burst streams comprise:
at least one burst segment portion transmittable at a first rate for a first time period, wherein the first rate comprises a nominal bandwidth rate of the communication channel and an excess bandwidth rate of the communication channel; and
at least one other burst segment portion transmittable at a second rate for a second time period, wherein the second rate comprises the excess bandwidth rate of the communication channel and the second time period is subsequent to the first time period; and
one or more processing devices configured to execute the server module, wherein the temporal offset time is set responsive to the channel change delay time.

7. The system of claim 6, wherein the media stream is designed to be consumed by a decoding process at the nominal bandwidth rate.

8. The system of claim 6, wherein the server module is configured to:
receive the media stream prior to replicating the media stream; and
delay the media stream by a delay time that equals or exceeds the duration time of the GOP of the media stream, wherein the delaying is performed after receiving the media stream and prior to multicasting the multiple burst streams.

9. The system of claim 6, wherein the multiple burst streams are multicast using Internet Group Management Protocol (IGMP).

10. One or more computer readable storage devices having processor executable instructions stored thereon which, when executed by a processor, perform acts comprising:
replicating a media stream to provide a multicast bouquet having multiple burst streams, wherein a number of the multiple burst streams of the multicast bouquet is set at least in part according to a maximum desired channel change delay time; and
multicasting the multiple burst streams of the multicast bouquet via a communication channel, wherein the multiple burst streams are separated in the communication channel by a temporal offset time shorter than a duration time of a group of pictures (GOP) of the media stream, and wherein individual burst streams comprise:
at least one burst segment portion transmittable at a first rate for a first time period, wherein the first rate comprises a nominal bandwidth rate of the communication channel and an excess bandwidth rate of the communication channel; and
at least one other burst segment portion transmittable at a second rate for a second time period, wherein the second rate comprises the excess bandwidth rate of the communication channel and the second time period is subsequent to the first time period,
wherein the temporal offset time is set responsive to the maximum desired channel change delay time.

11. The one or more computer readable storage devices of claim 10, wherein the media stream is designed to be consumed by a decoding process at the nominal bandwidth rate.

12. The one or more computer readable storage devices of claim 10, wherein the acts further comprise:
prior to the replicating, receiving the media stream; and
delaying the media stream by a delay time that equals or exceeds the duration time of the GOP of the media stream, wherein the delaying is performed after the receiving and prior to the multicasting.

13. The one or more computer readable storage devices of claim 10, wherein the multiple burst streams are multicast using Internet Group Management Protocol (IGMP).

14. The one or more computer readable storage devices of claim 10, wherein the multiple burst streams are substantially identical.

\* \* \* \* \*

UNITED STATES PATENT AND TRADEMARK OFFICE
CERTIFICATE OF CORRECTION

PATENT NO.       : 8,135,040 B2
APPLICATION NO.  : 11/292298
DATED            : March 13, 2012
INVENTOR(S)      : Maurice Cuijpers et al.

It is certified that error appears in the above-identified patent and that said Letters Patent is hereby corrected as shown below:

In column 14, line 27, after "described" insert -- in --.

Signed and Sealed this
Second Day of October, 2012

David J. Kappos
*Director of the United States Patent and Trademark Office*